US008854344B2

(12) United States Patent
Glen

(10) Patent No.: US 8,854,344 B2
(45) Date of Patent: Oct. 7, 2014

(54) SELF-REFRESH PANEL TIME SYNCHRONIZATION

(75) Inventor: David Glen, Toronto (CA)

(73) Assignee: ATI Technologies ULC, Markham, Ontario (CA)

( * ) Notice: Subject to any disclaimer, the term of this patent is extended or adjusted under 35 U.S.C. 154(b) by 263 days.

(21) Appl. No.: 13/324,685

(22) Filed: Dec. 13, 2011

(65) Prior Publication Data

US 2012/0146968 A1 Jun. 14, 2012

Related U.S. Application Data

(60) Provisional application No. 61/422,337, filed on Dec. 13, 2010.

(51) Int. Cl.

| | |
|---|---|
| ***G06F 3/038*** | (2013.01) |
| ***G09G 5/00*** | (2006.01) |
| ***G09G 5/36*** | (2006.01) |
| ***G09G 5/12*** | (2006.01) |

(52) U.S. Cl.

CPC ............ *G09G 5/363* (2013.01); *G09G 2370/10* (2013.01); *G09G 5/003* (2013.01); *G09G 5/12* (2013.01); *G09G 2330/021* (2013.01); *G09G 2320/103* (2013.01); *G09G 2360/18* (2013.01); *G09G 5/006* (2013.01); *G09G 2370/04* (2013.01)

USPC ............................................ 345/204; 345/530

(58) Field of Classification Search

CPC .................. G09G 2320/103; G09G 2330/021; G09G 5/003; G09G 5/363

USPC ............................................ 345/530–545, 204

See application file for complete search history.

(56) References Cited

U.S. PATENT DOCUMENTS

| | | | | |
|---|---|---|---|---|
| 6,657,634 | B1 * | 12/2003 | Sinclair et al. | 345/534 |
| 2006/0020835 | A1 * | 1/2006 | Samson et al. | 713/300 |
| 2006/0092741 | A1 * | 5/2006 | Kim et al. | 365/222 |
| 2006/0259804 | A1 * | 11/2006 | Fry | 713/324 |
| 2008/0079739 | A1 * | 4/2008 | Gupta et al. | 345/520 |
| 2011/0157198 | A1 * | 6/2011 | Vasquez et al. | 345/531 |

* cited by examiner

*Primary Examiner* — Viet Pham

(74) *Attorney, Agent, or Firm* — Sterne, Kessler, Goldstein & Fox P.L.L.C.

(57) ABSTRACT

In an embodiment, a method in a device of controlling a display is provided. The method includes transmitting a heartbeat signal in a self-refresh state. The heartbeat signal is configured to be used by a display to remain in sync with the device while the device is in the self-refresh state.

38 Claims, 7 Drawing Sheets

SELF-REFRESH PANEL TIME SYNCHRONIZATION

CROSS REFERENCE TO RELATED APPLICATIONS

This application claims the benefit of U.S. Provisional Appl. No. 61/422,337, filed Dec. 13, 2010, which is incorporated by reference herein in its entirety.

BACKGROUND

1. Field

The present invention relates to controlling a display device.

2. Background

In graphics systems, a display controller sends image frames and timing signals to a display device. The display device displays the image frames at a refresh rate determined by the timing signals. The display controller can be included in or coupled to a graphics processing device such as a graphics processing unit (GPU). In some situations, the display can become static. That is, a number of successive image frames to be displayed are identical. This situation may arise, for example, if an extended period of time has passed before a user has interacted with the system, e.g., when a user does not interact with a laptop computer for a specified period of time.

When the display becomes static, the elements of the graphics system can be switched to a self-refresh state. In the self-refresh state, much or all of the display controller and/or GPU can be powered down. On the display side, in the self-refresh state, the display device can capture the last received image frame in a buffer. Moreover, the display can also locally generate timing signals used to refresh the display. Thus, in the self-refresh state, the display essentially operates independently of the display controller.

When the display ceases to be static, i.e., when the image frame to be displayed changes, the graphics system transitions back to a normal power state. During the time in which the elements of the system were in the self-refresh state, the clock signals of the display controller and the display may have become out of sync. Thus, there may be a delay in updating the display when the system switches back to the normal power state.

BRIEF SUMMARY

Embodiments described herein generally relate to providing a heartbeat signal to a display device when the graphics system is in a self-refresh state, e.g., a self-refresh state. The heartbeat signal can be used by the display device to generate and/or correct locally generated timing signals so that the display device and display controller remain in sync during the time the system is in the self-refresh state.

In an embodiment, a method in a device of controlling a display is provided. The method includes transmitting a heartbeat signal in a self-refresh state. The heartbeat signal is configured to be used by a display to remain in sync with the device while the device is in the self-refresh state, In another embodiment, a display controller includes a static image detection module and a timing module configured to generate a timing signal in a first state and a heartbeat signal in a second state. The timing module is configured to switch between the first and second states responsive to a signal received from the static image detection module.

In still another embodiment, a display device includes a self-refresh controller configured to control the display device to operate in a first state or a second state, wherein the first state is a self-refresh state, drivers configured to drive respective pixels of the display device, and a controller configured to control the drivers when the display device operates in the first state based on a received heartbeat signal, Further features and advantages of the invention, as well as the structure and operation of various embodiments of the invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. Generally, the drawing in which an element first appears is typically indicated by the leftmost digit(s) in the corresponding reference number.

DETAILED DESCRIPTION OF EMBODIMENTS OF THE INVENTION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 1:
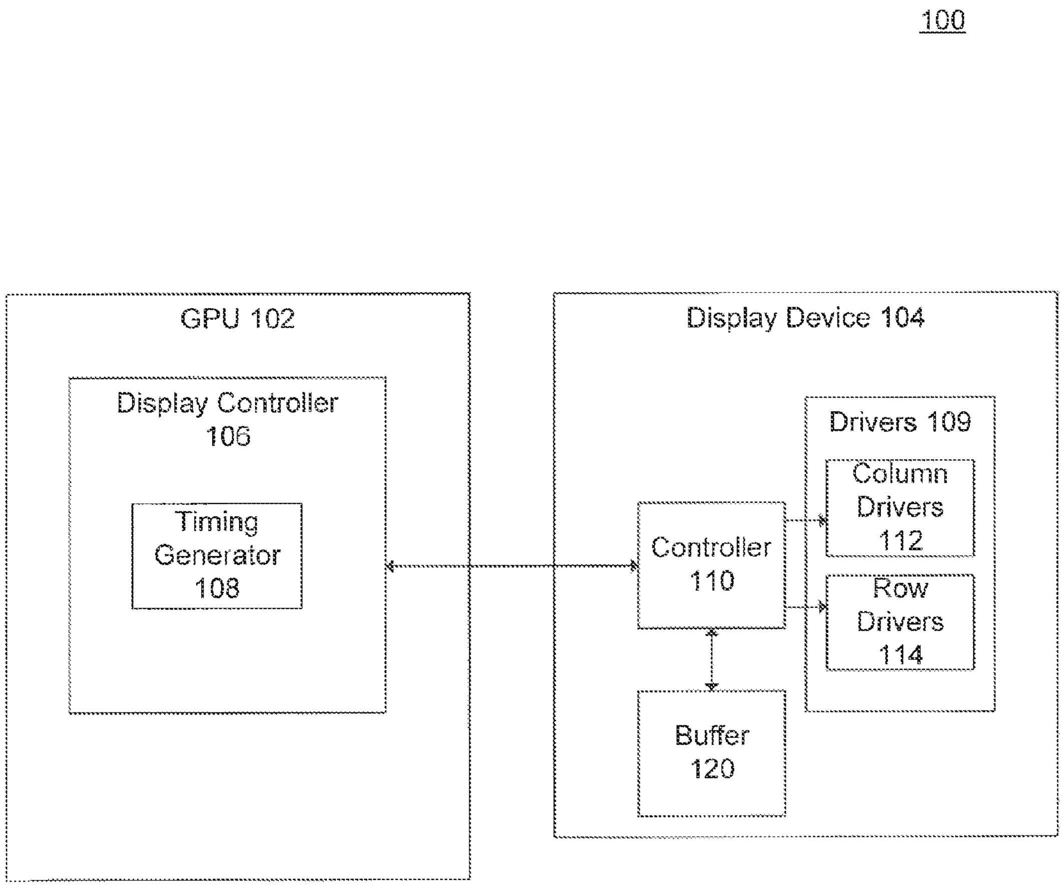
FIG. 1 shows a block diagram of a graphics system.

FIG. 1 shows a block diagram of a graphics system 100. Graphics system 100 includes a graphics processing unit (GPU) 102 and a display device 104. Graphics system 100 can be implemented in a laptop computer. In other embodiments, graphics system 100 can be implemented in other systems having graphics capabilities, as would be appreciated by those skilled in the relevant arts based on the description herein.

GPU 102 includes a display controller 106 including a timing generator 108. In alternate embodiments, display controller 106 can be implemented separate of GPU 102. Display controller 106 and timing generator 108 can be implemented as hardware blocks, e.g., hardware blocks on a die that includes GPU 102.

Display device 104 can be one of a variety of different display devices, e.g., a liquid crystal display (LCD) panel. Display device 104 includes a controller 110, a buffer 120, and drivers 109. In an embodiment, drivers 109 include a set of column drivers 112 and set of row drivers 114. Although FIG. 1 shows controller 110 and buffer 120 as separate elements, in another embodiment buffer 120 can be included in controller 110. Each of controller 110, buffer 120, and drivers 109 can be implemented as respective hardware blocks.

Display controller 106 drives display device 104 to display desired image/video data refreshed at a predetermined frequency. To that end, display controller 1.06 sends image frames and timing signals. For example, one or more rendering engines of GPU 102 (not shown in FIG. 1) can generate the image frames to be displayed and timing generator 108 can generate timing signals used to control the refresh rate.

Timing generator 108 can include a frequency synthesizer coupled to a crystal or oscillator. For example, the frequency synthesizer can be a phase locked loop. The frequency synthesizer can generate a pixel clock having a predetermined frequency, e.g., 25 MHz. The pixel clock, then, can be input to a set of counters that are used to generate timing signals including vertical sync (v_sync) and horizontal sync (h_sync) signals. Signal v_sync controls determines when display device 104 switches from one frame to another frame. Signal h_sync controls when display device 104 starts refreshing successive rows of the display.

Controller 110 of display device 104 receives the frames and timing signals from display controller 106. Based on the received frames and timing signals, controller 110 controls drivers 109 to display the image frames and refreshes the display device at a rate determined by the timing signals. As shown in FIG. 1, drivers 109 include column drivers 112 and row drivers 114. As would be appreciated by those skilled in the art based on the description herein, column drivers 112 and row drivers 114 together control the state of each pixel of display device 104.

In some situations, the display becomes static. That is, a number of image frames to be displayed consecutively are identical. The image frame that is displayed repeatedly is termed the "static frame." When the display becomes static, GPU 102 continues to generate image frames (which are identical to the ones before it during the static period) as well as the timing signals. Moreover, while the image is static, the interface between GPU 102 and display device 104, the frame buffer of GPU 102 (not shown in FIG. 1), and the core logic of GPU 102 (not shown in FIG. 1) remain powered.

To save power when the display becomes static, GPU 102 and display device 104 can switch to a self-refresh state. In the self-refresh state, display controller 106 sends a signal to display device 104 instructing it to switch to self-refresh state and then GPU 102 switches to self-refresh state. For GPU 102 the self-refresh state can be a low power state in which many of the components of GPU 102 are powered down (e.g., portions of the frame buffer and core logic) and many of the clocks on GPU 102 can have their frequencies reduced. In another embodiment, in the self-refresh state, substantially all of GPU 102 is powered down. In that embodiment, only the logic and memory needed to maintain state information and allow for fast start-up remain powered. Those skilled in the art will recognize that while the self-refresh state can be a low power state for GPU 102, display device 104 may actually consume more power in this state. But because the amount of power saved by running GPU 102 in the self-refresh state exceeds the additional power consumed by display device 104 in the self-refresh state, on net power consumption is reduced. Moreover, those skilled in the art will recognize that the term "self-refresh state" may refer to states in which the complete display remains static as well as states in which a majority of the display remains static, otherwise termed "partial self-refresh states."

Upon receiving the signal instructing it to switch to self-refresh state, display device 104 captures the static frame and holds it in buffer 120. For example, display device 104 can capture the most recent image frame received from GPU 102. Thereafter, while the display remains static, controller 110 drives drivers 109 using the image frame held in buffer 120. In the self-refresh state, the pixels of display device 104 must still be refreshed. Thus, in the self-refresh state, the timing signals are generated locally at display device 104. Specifically, controller 110 can include a frequency synthesizer that is activated in the self-refresh state. This frequency synthesizer can generate a pixel clock having the same frequency as the pixel clock generated by timing controller 108. This pixel clock can be input into a set of counters of controller 110 to generate the timing signals (e.g., v_sync and h_sync signals).

When the display ceases to be static, GPU 102 is restored to a full power state and resumes control of the operation of display device 104. While GPU 102 and display device 104 were in the self-refresh state, however, the pixel clock generated locally by controller 110 may have become out of phase relative to clocks on GPU 102. Thus, the locally generated pixel clock can be out of phase relative to the pixel clock generated by timing generator 108. When GPU 102 and display device 104 are out of phase, a delay can be experienced in displaying the first new image frame after the static frame.

In embodiments described herein, a display controller is configured to generate a heartbeat signal that is sent to a display device while the display device and the display controller are in self-refresh states. The display device uses the heartbeat signal to generate (or correct) locally timing signals (e.g., v_sync and h_sync signals). In doing so, the display device remains in sync with the display controller, reducing or eliminating the delay experienced in displaying new frames when normal operation resumes after the self-refresh state. Alternatively, the display device can generate and output a heartbeat signal to the display controller. When the display controller exits from the self-refresh state, the display device can use the heartbeat signal to restart its timing generator synchronized with the current display timing.

Figure 2:
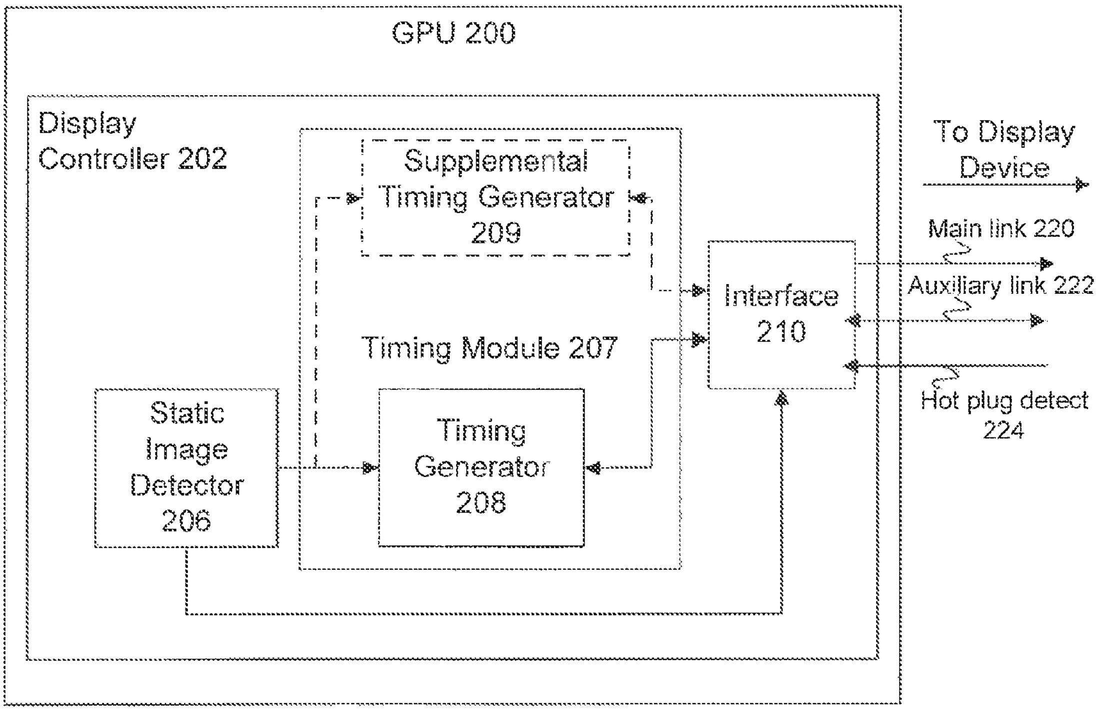
FIG. 2 shows a block diagram of a graphics processing unit.

FIG. 2 shows a block diagram of a GPU 200. GPU 200 includes display controller 202, which includes a static image detector 206, a timing module 207, and an interface 210. Timing module 207 includes a timing generator 208 and optionally includes a supplemental timing generator 209. The elements of display controller 202 can be implemented as hardware, software, firmware, or a combination thereof. In the embodiment in which portions of display controller 202 are implemented as software, these portions can run on a processor coupled to a memory. For example, portions of display controller 202 can run on one or more processors of the core processing logic of GPU 200. In another embodiment, each of the elements of display controller 202 can be implemented as a separate hardware block.

Static image detector 206 is configured to detect when the display has become static. For example, static image detector 206 can detect when a pre-determined number of successive image frames are identical. If the display has become static, static image detector 206 sends a signal to the display device over interface 210 and switches GPU 200 to a self-refresh state.

During the normal power state, timing generator 208 of timing module 207 generates timing signals that are used to control the refresh rate of the display. For example, timing generator 208 can be substantially similar to timing generator 108. Specifically, timing generator 208 can include a frequency synthesizer that generates a pixel clock and a set of counters that generate the timing signals based on the pixel clock.

As described above, the self-refresh state can be a low power state of GPU 202 in which some (or substantially all) of the components of GPU 202 are powered down or completely shut down. In switching GPU 202 to the self-refresh state from the normal power state, static image detector 206 sends a signal to timing module 207. Responsive to this signal, timing module 207 generates a heartbeat signal, which is sent to the display over interface 210.

As shown in FIG. 2, timing module 207 includes timing generator 208 and optionally includes a supplemental timing generator 209. In one embodiment, in the self-refresh state, timing generator 208 can remain powered. Specifically, in the self-refresh state, timing module 207 can control timing generator 208 to output the pixel clock. In this embodiment, the pixel clock is the heartbeat signal that is sent to the display device.

The frequency of the heartbeat signal can be the same frequency as the pixel clock used by timing generator 208 when GPU 200 and/or display controller 202 are not in the self-refresh state. Alternatively, the pixel clock used as the heartbeat signal can be at a lower frequency than the pixel clock used when GPU 200 and/or display controller 202 are not in the self-refresh state, thereby saving power. For example, if the pixel clock frequency is 100 MHz and the number of pixels in the display is divisible by 100, the heartbeat signal can have a frequency of 1 MHz. In an embodiment, the frequency of the heartbeat signal can be equal to the frequency of the v_sync signal, e.g., 60 Hz.

In another embodiment; supplemental timing generator 209 can be used to generate the heartbeat signal. In this embodiment, in response to the signal from static image detector 206, timing generator 208 is substantially powered down and supplemental timing generator 209 is activated. Supplemental timing generator 209 can include a frequency synthesizer that generates the heartbeat signal. The frequency synthesizer of supplemental timing generator 209 can be simpler than the frequency synthesizer of timing generator 208 because the former is only used to generate the heartbeat signal, which can be of a lower frequency than the pixel clock.

Interface 210 communicates with a display device over the DisplayPort, which includes a main link 220, an auxiliary link 222, and a hot plug detect 224. Main link 220 can be a set of high speed differential pairs that are used to communicate video and audio information from GPU 200 to the display device. During the normal power state, GPU 202 sends image frames and the timing signals to the display device over main link 220. Auxiliary line 222 can include a single differential pair that is bi-directional between GPU 200 and the display device. Hot plug detect 224 is an interrupt line in the DisplayPort spec that can be used any time a sink (e.g., a display device) needs to send a message to the source (e.g., a graphics processing device). For example, hot plug detect 224 can be used to inform GPU 200 of the presence of the display device.

The heartbeat signal can be transmitted to the display device over main link 220. In another embodiment, the heartbeat signal is sent to the display device over auxiliary link 222. For example, the auxiliary link 222 can be coupled to a register in the display device and the different portions of the heartbeat signal (e.g., logical highs and logical lows) can set and clear the value in the register. In an embodiment, the heartbeat signal can be a simple pulse signal. In other embodiments, the heartbeat signal can be a signal having a specific bit pattern.

Figure 3:
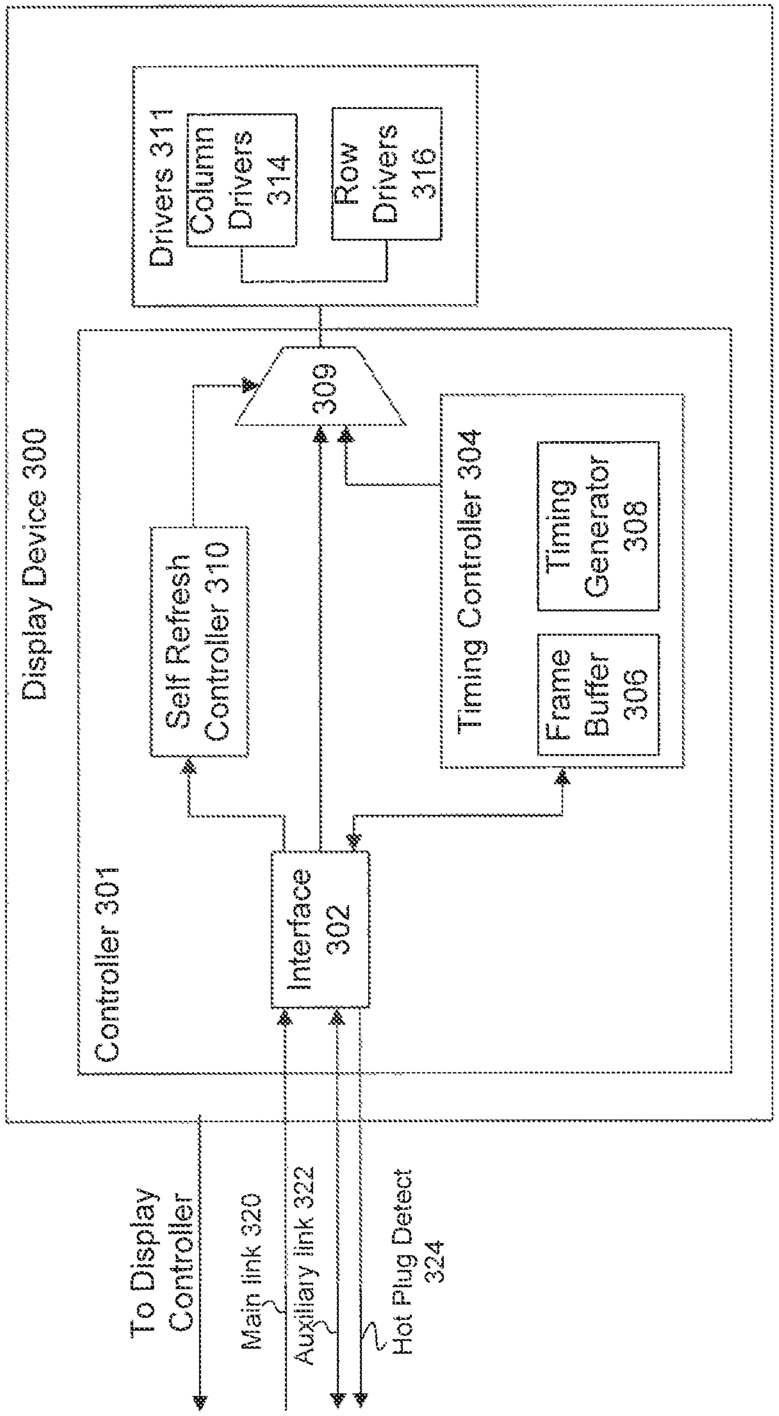
FIG. 3 shows a block diagram of a display device.

FIG. 3 shows a block diagram of a display device 300. Display device 300 can be configured to operate with a GPU, e.g., GPU 200 shown in FIG. 2. Display device 300 includes a controller 301 and drivers 311. Controller 301 includes an interface 302, a timing controller 304, a multiplexer 309, and a self-refresh controller 310. Timing controller 304 includes a frame buffer 306 and a timing generator 308. Drivers 311 can include a set of column drivers 314 and a set of row drivers 316. Portions of display device 300 can be implemented as software, hardware, firmware or a combination thereof. In the embodiment in which portion of display device 300 in which at least a portion of display device 300 is implemented as software, display device 300 can include a processor coupled to a memory, (not shown) on which they run. In another embodiment, each of the elements of display device 300 are included in a separate hardware block.

Controller 301 controls drivers 311 to display desired image frames based on information received from a display controller (e.g., display controller 202 shown in FIG. 2). As shown in FIG. 3, interface 302 is coupled to a display controller through a main link 320, auxiliary link 322, and a hot plug detect 324. For example, interface 302 can be coupled to display controller 202 over interface 302. Main link 320, auxiliary link 322, and hot plug detect 324 can be substantially similar to main link. 220, auxiliary link 222, and hot plug detect 224, respectively, described with reference to FIG. 2. When display device 300 is not in a self-refresh state, display device 300 receives image frames and timing signals (e.g., v_sync and h_sync) from the display controller via main link 320.

As shown in FIG. 3, drivers 311 can be controlled by either timing controller 304 or interface 302 based on a control signal provided by self-refresh controller 310 to multiplexer 309. Specifically, when self-refresh controller 310 receives a command from the display controller (via interface 302) to transition device 300 to a self-refresh state, self-refresh controller 310 generates a control signal such multiplexer 309 outputs the output of timing controller 304. On the other hand, when self-refresh controller 310 receives a command to transition from a self-refresh state to a normal power state, self-refresh controller 310 generates a control signal that controls multiplexer 309 to output the signal received from interface 302. Thus, when display device 300 is in a normal power state, drivers 311 can be controlled by information received from the display controller at interface 302 and when display device 30 is in the self-refresh state, drivers 311 can be controlled by timing controller 304.

Timing controller 304 includes a frame buffer 306 and a timing generator 308. Frame buffer 306 can be a memory (e.g., random access memory (RAM)). Frame buffer 306 is used to hold the static frame, i.e., a frame to be displayed while displayed device 300 is in a self-refresh state. In an embodiment, once self-refresh controller 310 receives the command to transition to the self-refresh state, timing controller 304 captures the last frame transmitted from display controller and holds that frame as the static frame in frame buffer 306. Timing controller 304 can also include logic (not shown) that performs a validity check on the frames stored in frame buffer 306, e.g., using known techniques, such as a circular redundancy check (CRC).

In the self-refresh state, timing generator 308 generates timing signals (e.g., v_sync and h_sync) used by timing controller 304 to control drivers 311. Specifically, timing generator 308 generates the timing signals based on the heartbeat signal based on the received the heartbeat signal. For example, timing generator 308 can use counters (not shown in FIG. 3) to generate the timing signals and can dynamically adjust the locally generated timing signals based on the received heartbeat signal. For example, timing generator 308 can dynamically add or subtract lines from the frame period based on the received heartbeat signal. In another embodiment, the heartbeat signal can be used as a substitute for a pixel clock. For example, timing generator 308 can include counters that receive the heartbeat signal and generate the timing signals accordingly in a manner substantially similar to timing generators 108 and 208 shown in FIGS. 1 and 2, respectively.

When the display controller generates the heartbeat signal, the heartbeat signal can be sent to display device 300 over main link 320 or auxiliary link 322. When the heartbeat signal is sent over main link 320, timing controller 304 receives the heartbeat signal from interface 302. On the other hand, when the heartbeat signal is transmitted over auxiliary link 322, e.g., by periodic register rights, timing controller 304 can read from this register periodically and use the periodic setting and clearing of the register as the heartbeat signal.

FIGS. 2 and 3 have been described with regard to the embodiment in which the display controller transmits the heartbeat signal to the display device in the self-refresh mode. In an alternate embodiment, the heartbeat signal can instead be generated by the display device and transmitted to the display controller. For example, timing controller 308 of display device 300 can select a preferred timing and can generate, a heartbeat signal using this preferred timing that is using by the display device when it exits out of the self-refresh state. The preferred timing may or may not be the same rate as for the standard display mode. Timing generator 208 of display device 202 can synchronize itself to the received heartbeat signal upon exiting from the self-refresh state. This heartbeat signal can be transmitted from the display device over auxiliary link 320 or hot plug detect 324 and can be a simple pulse signal or a signal having a specific bit pattern.

Figure 4:
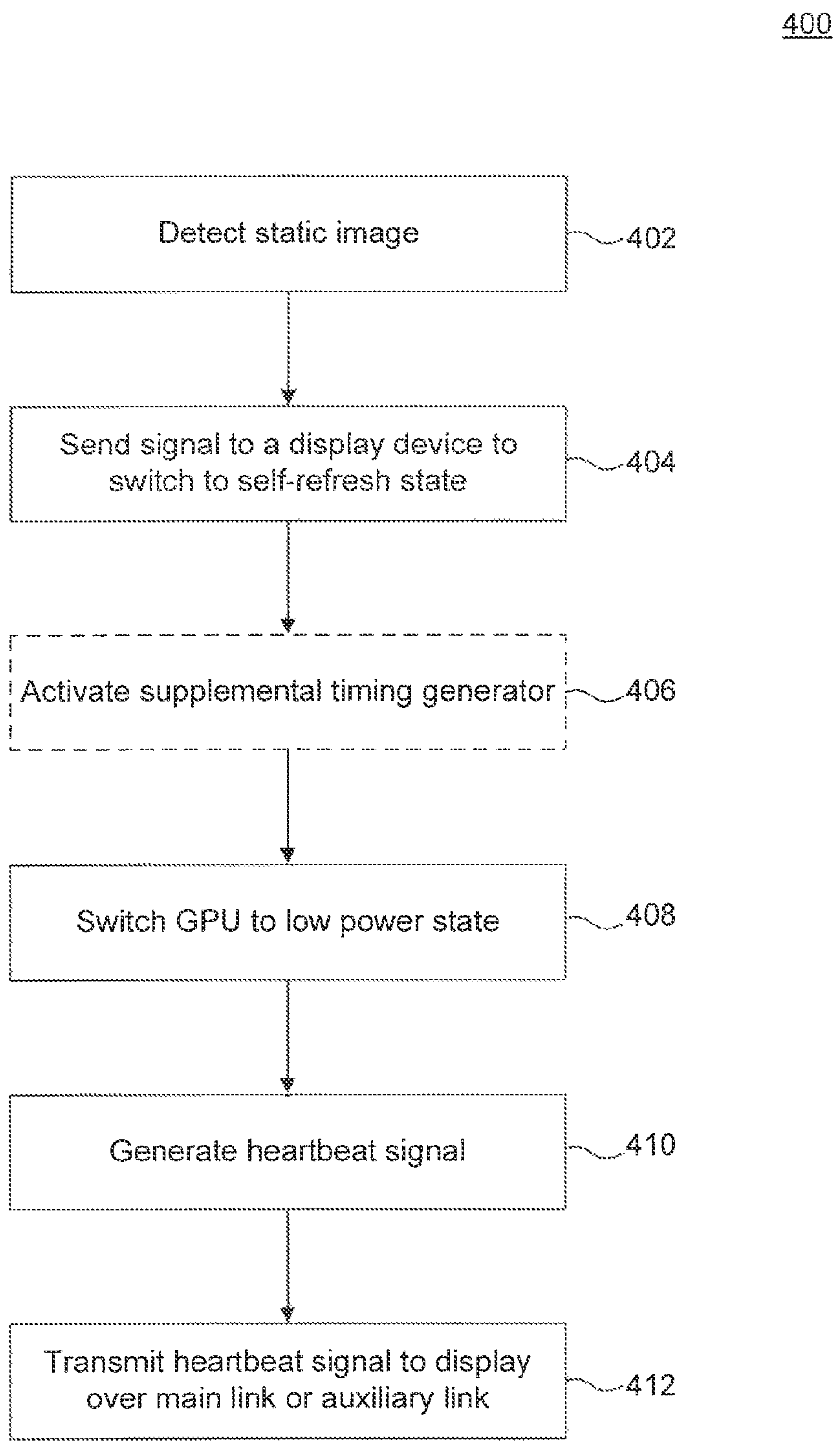
FIG. 4 shows a flowchart of an exemplary method of controlling a display.

FIG. 4 shows a flowchart of an exemplary method 400 of controlling a display. Other structural and operational embodiments will be apparent to persons skilled in the relevant art(s) based on the following discussion. Method 400 is described with reference to the embodiment of FIG. 2. However, method 400 is not limited to that embodiment. The steps shown in FIG. 4 do not necessarily have to occur in the order shown. The steps of FIG. 4 are described in detail below.

In step 402, a static image is detected. For example, in FIG. 2, static image detector 206 can detect when the image to be displayed has become static. For example, static image detector 206 can detect when a predetermined number of image frames are identical.

In step 404, a signal is sent to a display device to switch to a self-refresh state. For example, in FIG. 2, responsive to static image detector 206 determining that the image to be displayed is static, display controller 202 can send a command to a display device instructing it to transition to a self-refresh state. For example, such a command such a command can be transmitted over main link 220.

In optional step 406, a supplemental timing generator is activated. For example, in FIG. 2, optional supplemental timing generator 209 can be activated. For example, in the embodiment in which when GPU 200 goes into the self-refresh state timing generator 208 is substantially powered down, supplemental timing generator 209 can be activated.

In step 408, the GPU is switched to a low power state. For example, in FIG. 2, GPU 200 can be switched to a self-refresh state in which much or substantially all of GPU 200 is powered down or shut down.

In step 410, a heartbeat signal is generated. For example, in FIG. 2, timing generator 208 or supplemental timing generator 209 can generate a heartbeat signal, as described above.

In step 412, the heartbeat signal can be transmitted to display device over the main link or auxiliary link. For example in FIG. 2, the heartbeat signal can be transmitted to a display device over main link 220 or auxiliary link 222.

Figure 5:
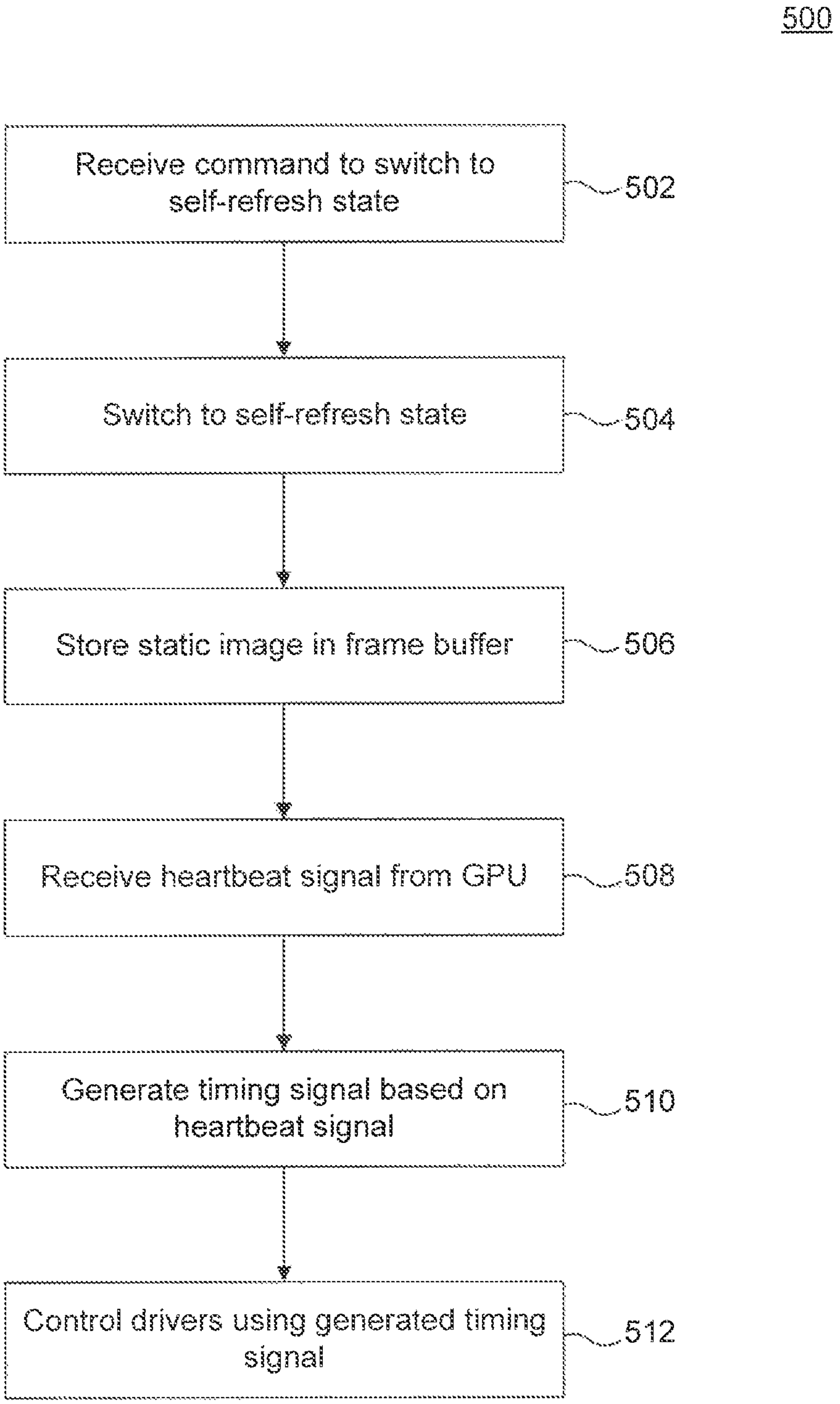
FIG. 5 shows a flowchart of an exemplary method of operating a display device.

FIG. 5 shows a flowchart of an exemplary method 500 of operating a display device. Other structural and operational embodiments will be apparent to persons skilled in the relevant art(s) based on the following discussion. Method 500 is described with reference to the embodiment of FIG. 3. However, method 500 is not limited to that embodiment. The steps shown in FIG. 5 do not necessarily have to occur in the order shown. The steps of FIG. 5 are described in detail below, In step 502, a command is received to switch to a self-refresh state. For example, in FIG. 3, self-refresh controller 310 can receive a command from a display controller via interface 302 to switch to a self-refresh state.

In step 504, the display device is switched to a self-refresh state. For example, in FIG. 3, self-refresh controller 310 can switch display device 300 to a self-refresh state. For example, self-refresh controller 310 can control multiplexer 309 so that multiplexer 309 outputs the output of timing controller 304.

In step 506, a static image is stored in a frame buffer. For example, in FIG. 3, timing controller 304 can capture the static frame and store the static frame in frame buffer 306.

In step 508, a heartbeat signal is received from the GPU. For example, in FIG. 3, timing generator 308 of timing controller of 304 can receive the heartbeat signal from the display controller via interface 302, e.g., over main link 320 or auxiliary link 322.

In step 510, timing signals (e.g., v_sync and h_sync signals) are generated based on the heartbeat signal. For example, in FIG. 3, timing generator 308 generates timing signals based on the received heartbeat signal. For example, timing generator 308 can dynamically adjust its own timing generator timing signal based on the received heartbeat signal, e.g., by adding or subtracting lines from a frame period based on the heartbeat signal or by using the heartbeat signal as a pixel clock, as described above.

Figure 6:
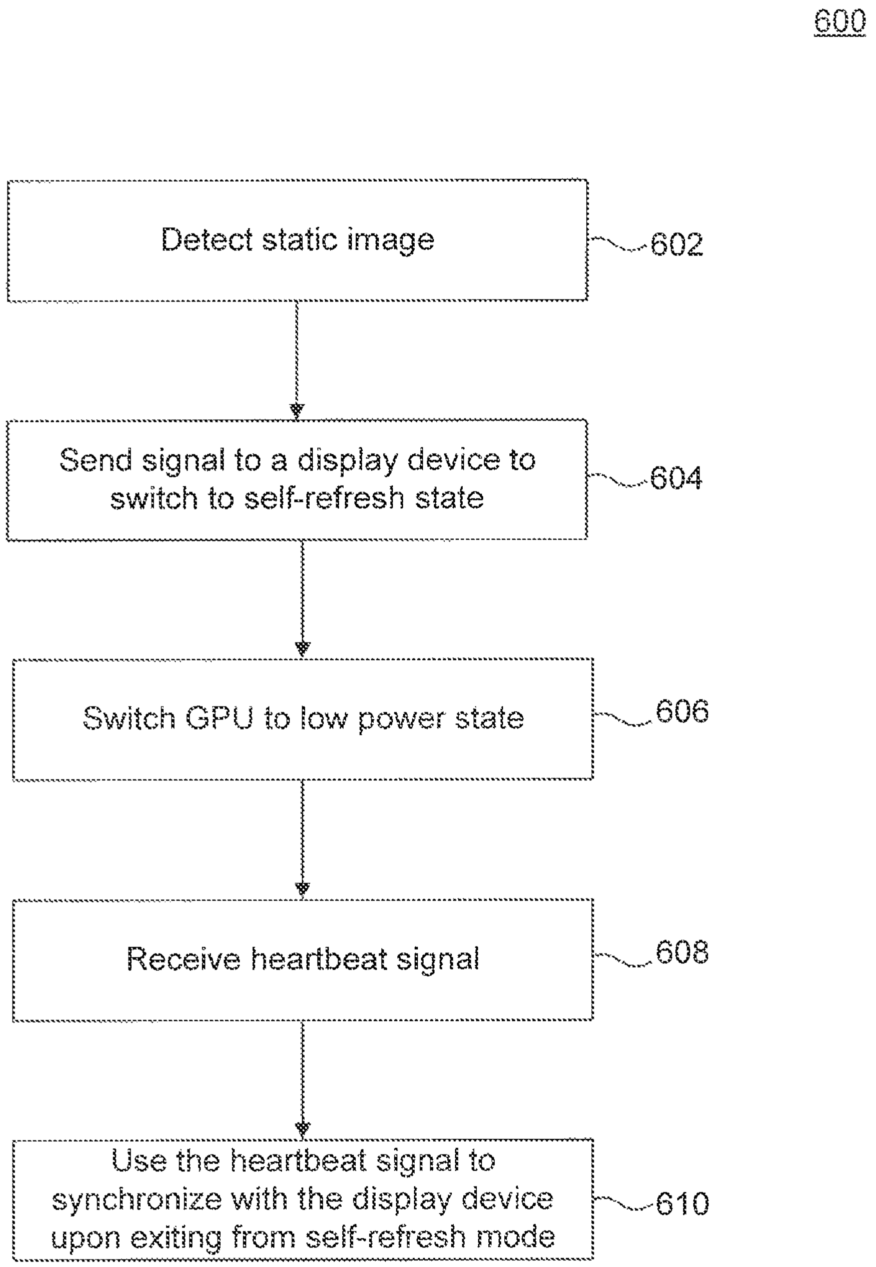
FIG. 6 shows a flowchart of an exemplary method of controlling a display.

In step 512, drivers are controlled using the generated timing signal. For example, timing controller 304 can control drivers 311 based on the timing signal generated by timing generator 308, The embodiments of FIGS. 4 and 5 have been described with regard to the embodiment in which the heartbeat signal is generated by the display controller and transmitted to the display device. As described above, in an alternate embodiment the display device can instead generate the heartbeat signal, which the display controller uses to synchronize itself with the display device upon exiting from self-refresh mode. Accordingly, FIG. 6 shows a flowchart of an exemplary method 600 of controlling a display. Other structural and operational embodiments will be apparent to persons skilled in the relevant art(s) based on the following discussion. The steps shown in FIG. 6 do not necessarily have to occur in the order shown. The steps of FIG. 6 are described in detail below.

In step 602, a static image is detected. In step 604, a signal is sent to a display device to switch to a self-refresh state. In step 606, the GPU is switched to a low power state. In an embodiment, steps 602, 604, and 606 are substantially similar to steps 402, 404, and 408 of method 400.

In step 608, a heartbeat signal is received. For example, in FIG. 2, a heartbeat signal can be received over auxiliary link 222 or hot plug detect 224. In an embodiment, display controller 202 can continuously monitor the heartbeat signal during the self refresh state. Alternatively, display controller 202 can begin to monitor the heartbeat signal after GPU 200 has exited from the self-refresh state.

In step 610, the heartbeat signal is used to generate a timing signal. For example in FIG. 2, the heartbeat signal can be used by either timing generator 208 or supplemental timing generator to generate timing signals for display controller 202 when GPU 200 exits from the self-refresh state. In such a manner, display controller 202 can be synchronized to the timing of the display device after exiting from the self-refresh state.

Figure 7:
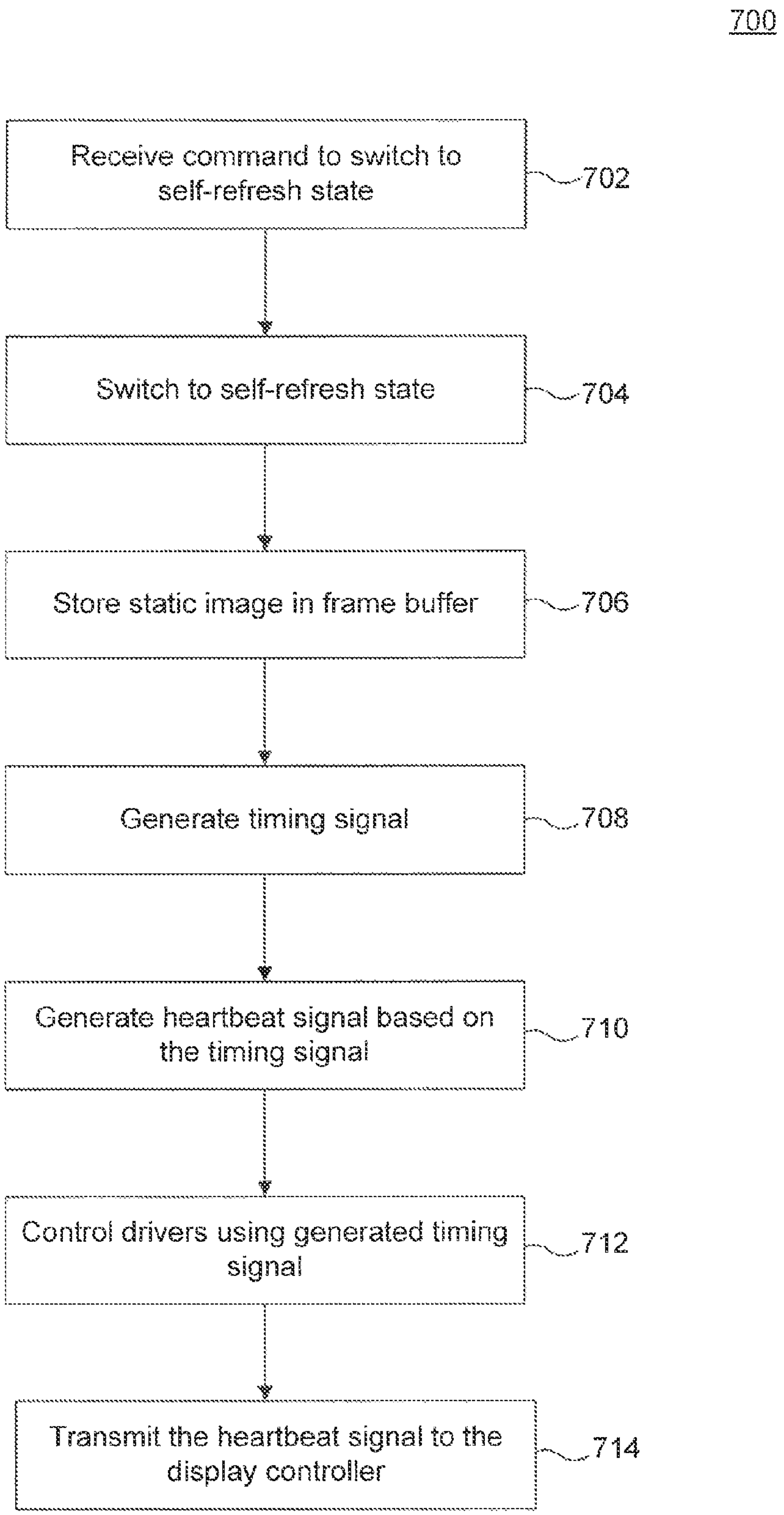
FIG. 7 shows a flowchart of an exemplary method of operating a display device.

FIG. 7 shows a flowchart of an exemplary method 700 of operating a display device. Other structural and operational embodiments will be apparent to persons skilled in the relevant art(s) based on the following discussion. The steps shown in FIG. 7 do not necessarily have to occur in the order shown. The steps of FIG. 7 are described in detail below.

In step 702, a command is received to switch to a self-refresh state. In step 704, the display device is switched to a self-refresh state. In step 706, a static image is stored in a frame buffer. In an embodiment, steps 702, 704, and 706 are substantially similar to steps 502, 504, and 506 of method 500.

In step 708, a timing signal is generated. For example, in FIG. 3, timing generator 308 can generate timing signals v_sync and h_sync signals) based on a preferred timing or the same timing as the standard display mode.

In step 710, a heartbeat signal is generated based on the generated timing signal. For example, in FIG. 3, timing generator 308 can generate a heartbeat signal based on the generated v_sync signal.

In step 712, drivers are controlled using the generated timing signal. For example, timing controller 304 can control drivers 311 based on the v_sync and h_sync signals generated by timing generator 308.

In step 714, the heartbeat signal is transmitted to the display controller. For example, the heartbeat signal can be transmitted over auxiliary link 322 or hot plug, detect 324 to display controller 202.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The breadth and scope of the present invention should not be limited by any of the above-described, exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A method of controlling a display device, comprising:

transmitting a pixel clock signal to the display device during a first state of the display device, wherein the display device is configured to use the pixel clock signal to control refresh of a display of the display device while the display device is in the first state; and responsive to a determination that the display device has entered a second state, transmitting a heartbeat signal to the display device, the second state being a self-refresh state, wherein the display device is configured to use the heartbeat signal to control refresh of the display while the display device is in the second state.

2. The method of claim 1, further comprising:

detecting a static image; and switching to the second state responsive to detecting the static image.

3. The method of claim 1, wherein the transmitting comprises:

transmitting the heartbeat signal to the display device over a main link or an auxiliary link.

4. The method of claim 1, further comprising:

responsive to a determination that the display device has entered the second state, activating a supplemental timing generator.

5. A method of operating a display device, comprising:

receiving a pixel clock signal from a display controller while the display device is in a first state, wherein the display device uses the pixel clock signal to control refresh of a display of the display device while the display device is in the first state;

switching the display device to a second state;

receiving a heartbeat signal from the display controller while the display device is in the second state; and generating a timing signal based on a heartbeat signal, wherein the display device uses the timing signal to control refresh of the display while the display device is in the second state.

6. The method of claim 5, further comprising:

controlling drivers of the display device using the timing signal.

7. The method of claim 6, further comprising:

storing a frame received from the display controller; and while the display device is in the second state, controlling the drivers to display the frame.

8. The method of claim 5, wherein switching comprises:

switching to the second state in response to a command received from the display controller.

9. The method of claim 5, further comprising:

receiving the heartbeat signal over a main link or an auxiliary link.

10. A display controller, comprising:

a static image detection module; and a timing module configured to generate a timing signal in a first state of the display controller and a heartbeat signal in a second state of the display controller, wherein the display controller is configured to switch between the first and second states responsive to a signal received from the static image detection module;

wherein the display controller is configured to transmit the timing signal and the heartbeat signal to a display device, wherein the display device is configured to use the timing clock signal to control refresh of a display of the display device while the display controller is in the first state, and wherein the display device is configured to use the heartbeat signal to control refresh of the display while the display controller is in the second state.

11. The display controller of claim 10, wherein the second state is a self-refresh state.

12. The display controller of claim 10, wherein the static image detection module is configured to output the signal at a first value when an image to be displayed has become static over a number of frames.

13. The display controller of claim 10, wherein the timing module comprises:

a timing generator configured to generate the timing signal.

14. The display controller of claim 13, wherein the timing module further comprises:

a supplemental timing generator configured to generate the heartbeat signal, wherein the timing generator is configured to activate the supplemental timing generator when the display controller switches to the second state.

15. The display controller of claim 10, further comprising:

an interface module coupled to the timing module and configured to communicate with the display device over a plurality of lines, the lines comprising a main line and an auxiliary line.

16. The display controller of claim 15, wherein the interface module is configured to receive the heartbeat signal and to send the heartbeat signal to the display device over the auxiliary link.

17. A display device, comprising:

a self-refresh controller configured to control the display device to operate in a first state or a second state, wherein the first state is a self-refresh state;

drivers configured to drive respective pixels of a display of the display device; and a controller configured to control the drivers based on a heartbeat signal received from a display controller when the display device is in the first state, wherein the drivers are controlled using a pixel clock signal received from the display controller while the display device is in the second state.

18. The display device of claim 17, wherein the controller comprises:

a timing generator configured to generate a timing signal based on the heartbeat signal.

19. The display device of claim 17, wherein the controller comprises:

a frame buffer configured to hold a frame to be displayed while the display device is in the first state.

20. The display device of claim 17, further comprising:

an interface configured to control the drivers with information received from the display controller when the display device operates in the second state, wherein the interface module is configured to receive the heartbeat signal and to transmit the heartbeat signal to the timing controller.

21. The display device of claim 20, wherein the interface is coupled to lines, the lines comprising a main line and an auxiliary line.

22. The display device of claim 21, wherein the interface is configured to receive the heartbeat signal over the main line.

23. A method of operating a display device, comprising:

receiving a pixel clock signal from a display controller during a first state of the display controller, wherein the display device is configured to use the pixel clock signal to control refresh of a display of the display device while the display controller is in the first state;

responsive to a determination that the display controller has entered a second state, transmitting a heartbeat signal to the display controller, wherein the second state is a self-refresh state, wherein the display controller is configured to use the heartbeat signal upon exiting from the second state to synchronize with the display device.

24. The method of claim 23, wherein the transmitting comprises:

transmitting the heartbeat signal to the display controller over an auxiliary link or a hot plug detect.

25. The method of claim 23, further comprising:

generating the heartbeat signal based on a timing signal.

26. The method of claim 25, further comprising:

controlling drivers of the display device using the timing signal.

27. The method of claim 26, further comprising:

storing a frame received from the display controller; and while the display controller is in the second state, controlling the drivers to display the frame.

28. The method of claim 23, further comprising:

switching to a self-refresh state in response to a command received from the display controller.

29. A display controller, comprising:

a static image detection module configured to control the display controller to operate in a first state and a second state, wherein the second state is a self-refresh state; and a timing module configured to generate a timing signal based on a heartbeat signal after exiting from the second state, wherein the timing module is configured to receive the heartbeat signal from a display device while the display controller is in the second state, wherein the timing module is configured to generate a pixel clock when the display controller is in the first state, and to transmit the pixel clock to the display device when the display controller is in the first state.

30. The display controller of claim 29, wherein the static image detection module is configured to output a signal at a first value when an image to be displayed has become static over a number of frames.

31. The display controller of claim 29, wherein the timing module comprises:

a timing generator configured to generate the timing signal.

32. The display controller of claim 29, wherein the timing module comprises:

a supplemental timing generator configured to generate the timing signal.

33. The display controller of claim 29, further comprising:

an interface module coupled to the timing module and configured to communicate with the display device over a plurality of lines, the lines comprising a main line and an auxiliary line.

34. A display device, comprising:

a self-refresh controller configured to control the display device to operate in a first state or a second state, wherein the first state is a self-refresh state;

drivers configured to drive respective pixels of the display device; and a timing controller configured to control the drivers when the display device operates in the first state and to output a heartbeat signal when the display device operates in the first state, wherein the heartbeat signal is configured to be used by a display controller to synchronize the display controller with the display device, wherein the drivers are controlled using a pixel clock signal received from the display controller while the display device is in the second state.

35. The display device of claim 34, wherein the timing controller comprises:

a timing generator configured to generate a timing signal when the display device is in the first state.

36. The display device of claim 34, wherein the timing generator is configured to generate the heartbeat signal based on the timing signal.

37. The display device of claim 34, wherein the timing controller comprises:

a frame buffer configured to hold a frame to be displayed while the display device is in the first state.

38. The display device of claim 34, further comprising:

an interface module that is configured to transmit the heartbeat signal to the display controller using either an auxiliary link or a hot plug detect.

* * * * *